(12) United States Patent
Wu et al.

(10) Patent No.: US 11,945,510 B2
(45) Date of Patent: Apr. 2, 2024

(54) DEVICE FOR A POWER OPENING TAILGATE OF A VEHICLE

(71) Applicant: Ningbo Geely Automobile Research & Development Co., Ltd., Ningbo (CN)

(72) Inventors: Biquan Wu, Gothenburg (SE); Helena Nilsson, Gothenburg (SE); Christoffer Brunsson, Gothenburg (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 766 days.

(21) Appl. No.: 17/063,474

(22) Filed: Oct. 5, 2020

(65) Prior Publication Data
US 2021/0054673 A1    Feb. 25, 2021

Related U.S. Application Data

(63) Continuation of application No. PCT/CN2019/082041, filed on Apr. 10, 2019.

(30) Foreign Application Priority Data

Apr. 11, 2018  (EP) ..................................... 18166883

(51) Int. Cl.
*B62D 25/12*    (2006.01)
*B60J 5/10*    (2006.01)
(Continued)

(52) U.S. Cl.
CPC .............. *B62D 25/12* (2013.01); *B60J 5/106* (2013.01); *B62D 25/24* (2013.01); *E05F 15/53* (2015.01);
(Continued)

(58) Field of Classification Search
CPC .................................. B60J 5/106; E05F 15/53
(Continued)

(56) References Cited

U.S. PATENT DOCUMENTS 7,377,075 B2 *  5/2008  Oberheide ............ E05F 15/627
                                                  296/56
8,136,861 B2 *  3/2012  Rajon ..................... E05F 5/022
                                                  296/50
(Continued)

FOREIGN PATENT DOCUMENTS

CN            1600623 A   *   3/2005
CN            1600623 A       3/2005
(Continued)

OTHER PUBLICATIONS

International Search Report from corresponding International Application No. PCT/CN2019/082041, dated Jul. 12, 2019, 2 pages.

*Primary Examiner* — Amy R Weisberg
*Assistant Examiner* — Veronica M Shull
(74) *Attorney, Agent, or Firm* — Tucker Ellis LLP

(57) ABSTRACT

A device for a power opening tailgate of a vehicle includes an attachment means mountable to a vehicle wall at a first side of the vehicle wall for supporting a working cylinder for opening the tailgate, and a component for reinforcement of the vehicle wall. The reinforcement component is mountable to the vehicle wall at a second side of the vehicle wall, which second side is opposite to the first side of the vehicle wall, and the attachment means and the reinforcement component are mechanically connectable to each other via a through hole of the vehicle wall.

18 Claims, 7 Drawing Sheets

(51) Int. Cl.
  *B62D 25/24* (2006.01)
  *E05F 15/53* (2015.01)
(52) U.S. Cl.
  CPC ... *E05Y 2201/422* (2013.01); *E05Y 2201/636* (2013.01); *E05Y 2600/61* (2013.01); *E05Y 2600/626* (2013.01); *E05Y 2600/634* (2013.01); *E05Y 2800/28* (2013.01); *E05Y 2900/546* (2013.01)
(58) Field of Classification Search
  USPC .......................................... 296/56, 76, 193.11
  See application file for complete search history.

(56) References Cited

U.S. PATENT DOCUMENTS

| | | | |
|---|---|---|---|
| 2006/0181108 A1* | 8/2006 | Cleland | E05F 15/43 296/146.4 |
| 2009/0196682 A1* | 8/2009 | Kuhlman | F16C 11/06 403/133 |
| 2009/0206531 A1* | 8/2009 | Probst | E05F 15/47 267/64.26 |
| 2009/0294196 A1* | 12/2009 | Stahl | E05F 1/1091 180/69.21 |

FOREIGN PATENT DOCUMENTS

| | | | | |
|---|---|---|---|---|
| CN | 201538362 | U | 8/2010 | |
| CN | 203600956 | U | 5/2014 | |
| CN | 204526755 | U | 8/2015 | |
| CN | 106740002 | A | 5/2017 | |
| CN | 206485401 | U | 9/2017 | |
| CN | 107458191 | A * | 12/2017 | .............. B60J 5/105 |
| CN | 107303803 | B * | 8/2019 | ................ B60J 5/10 |
| DE | 102008026502 | A1 | 12/2009 | |
| FR | 3044606 | A1 | 6/2017 | |
| JP | 2007239838 | A * | 9/2007 | |

* cited by examiner

DEVICE FOR A POWER OPENING TAILGATE OF A VEHICLE

RELATED APPLICATION DATA

This application is a continuation of International Patent Application No. PCT/CN2019/082041, filed Apr. 10, 2019, which claims the benefit of European Patent Application No. 18166883.1, filed Apr. 11, 2018, the disclosures of which are incorporated herein by reference in their entireties.

TECHNICAL FIELD

The invention relates to a device for a power opening tailgate of a vehicle, and a vehicle provided with such a device.

BACKGROUND

Today's cars may have a power opening tailgate. This means the tailgate can be remotely-controlled and opened by working cylinders without any manual power.

A drawback of the power opening tailgates is the high load on the wall of the car body structure supporting the working cylinder. In addition to the weight of the tailgate, an unfavourable angle of the working cylinder when the opening motion is initiated is the reason why the load on the wall is relatively high. For compensating for the load, a reinforcement plate for decreasing the stress can be attached by bolts at the position where a ball stud for the cylinder is attached to the wall.

Such a reinforcement plate however takes some space and may have a negative impact on the appearance of the surfaces exposed when the tailgate is in an open position.

SUMMARY

An objective of the invention is to provide a device for a power opening tailgate of a vehicle, by which device a vehicle wall supporting a working cylinder can be reinforced at the same time as the appearance of the exposed surface of the vehicle wall supporting the working cylinder can remain substantially unaffected.

The objective is achieved by a device for a power opening tailgate of a vehicle, wherein the device comprises an attachment means mountable to a vehicle wall at a first side of the vehicle wall for supporting a working cylinder for opening the tailgate, and a component for reinforcement of the vehicle wall, and wherein the reinforcement component is mountable to the vehicle wall at a second side of the vehicle wall, which second side is opposite to the first side of the vehicle wall, and the attachment means and the reinforcement component are mechanically connectable to each other via a through hole of the vehicle wall.

The invention is based on the insight that by such a device, the load from the working cylinder of a power opening tailgate can be transferred from the attachment means to the reinforcement component and received in a way reducing the stress on the vehicle wall at a position where the attachment means is mounted to the vehicle wall. Further, any reinforcement plate arranged on the working cylinder side of the vehicle wall can be dispensed with.

According to one embodiment of the device, the reinforcement component comprises a bracket and a spacer for positioning the bracket at a distance from the vehicle wall, and preferably the spacer is arranged for transferring load from the attachment means to the bracket. Hereby, the load from the working cylinder can be transferred by the spacer to the bracket and thereafter be favourably distributed to the vehicle body structure.

According to a further embodiment, the spacer has a first end for abutting the vehicle wall and a second end having a flange for abutting the bracket. Hereby, the assembling of the reinforcement component is facilitated and can be performed before the working cylinder is mounted. The bracket and the spacer can be joined by welding, and the bracket can be spot-welded to the vehicle body structure at several non-critical positions.

According to a further embodiment, the attachment means and the reinforcement component are connectable to each other by means of a threaded joint. Hereby, a safe connection between the attachment means and the reinforcement component and a non-complicated assembling thereof can be achieved.

According to further aspects of the invention, a further objective is to provide a vehicle body structure and/or a vehicle comprising a device for a power opening tailgate.

The advantages of the vehicle body structure and the vehicle are substantially the same as the advantages already discussed hereinabove with reference to the different embodiments of the device for a power opening tailgate of a vehicle. Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
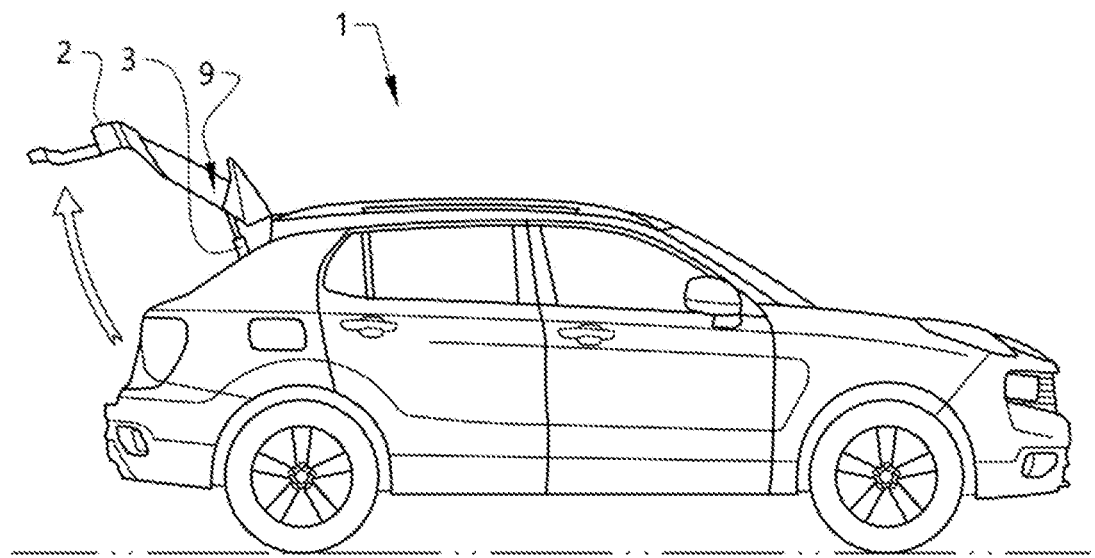
FIG. 1 is a side view of a vehicle having a power opening tailgate.

FIG. 1 is a side view of a vehicle 1, such as a passenger car, having a power opening tailgate 2. (Sometimes also called power operated tailgate.) The tailgate 2 can be opened by remotely-controlled working cylinders 3. The tailgate 2 is shown in an open position in FIG. 1.

Figure 2:
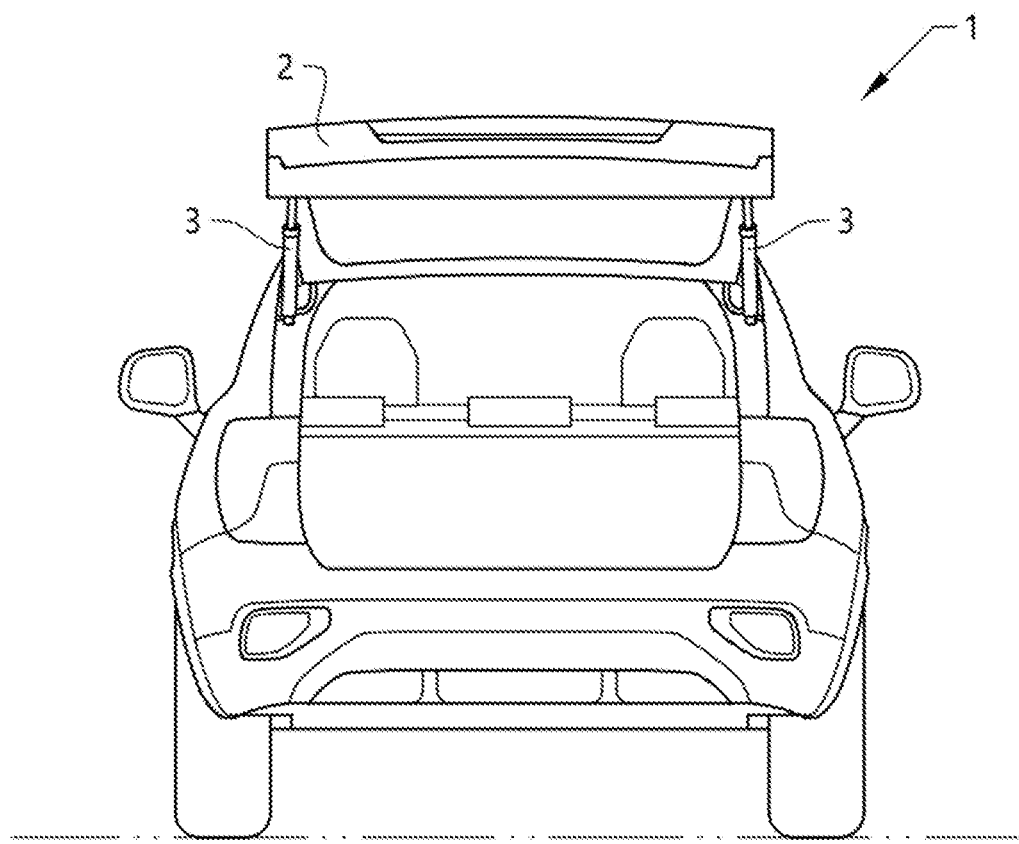
FIG. 2 is rear view of the vehicle illustrated in FIG. 1.

FIG. 2 shows a rear view of the vehicle 1 where the tailgate 2 is in the open position. As appears from FIG. 2, the vehicle 1 can have two such working cylinders 3, one working cylinder on the left-hand side and one working cylinder on the right-hand side of the vehicle. The working cylinders 3 are covered by the tailgate 2 when the tailgate is closed.

Figure 3:
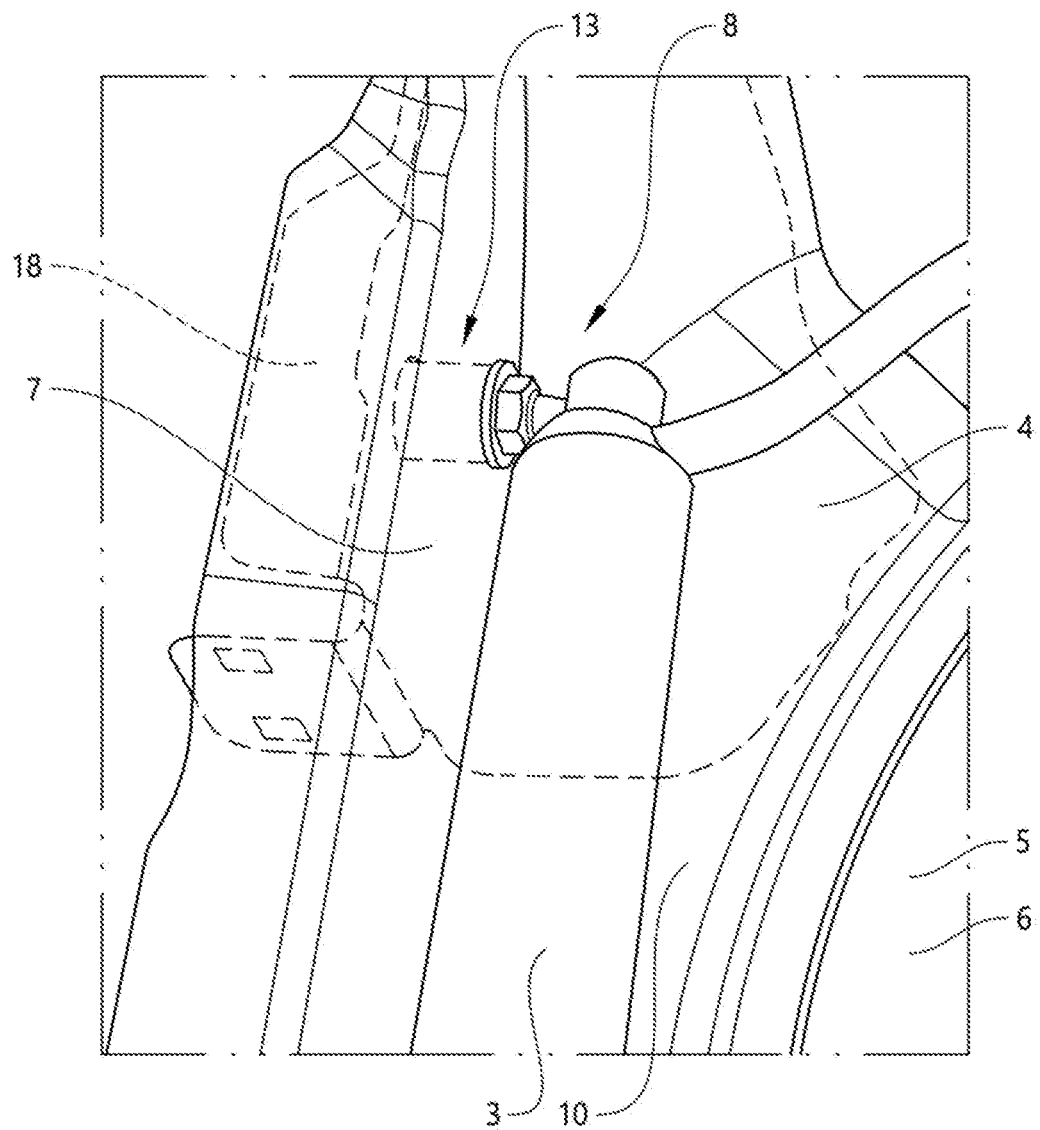
FIG. 3 is an enlarged part of FIG. 2 showing a working cylinder for a tailgate attached to a vehicle wall.

FIG. 3 shows an enlarged part of FIG. 2. An upper part on the left-hand side of the vehicle 1 where a working cylinder 3 is arranged is illustrated. The working cylinder 3 is in a position corresponding to the tailgate being closed. The tailgate has been omitted for illustration purposes only. The vehicle 1 comprises a vehicle body structure 4 defining a trunk 5. In a closed position, the tailgate 2 constitutes a delimiting surface for the trunk 5, and in an open position there is an opening in the body structure 4 for access to the trunk 5. In other words; the working cylinders 3 are arranged for moving the tailgate 2 relative to the body structure 4 to an opened position for enabling access to the trunk 5. The working cylinders 3 can also be used for closing the tailgate 2.

Each working cylinder 3 is preferably arranged in an area 10 outside the trunk opening 6. The working cylinder 3 is preferably arranged in an area in immediate proximity to the trunk opening 6. When the tailgate 2 is closed, the tailgate 2 covers the trunk opening 6 as well as the area 10 where the working cylinder 3 is arranged. In the example embodiment illustrated in FIG. 3, the body structure 4 has a wall 7 extending outside the trunk opening 6. One end 8 of the working cylinder 3 is attached to the wall 7. The other end 9 (see also FIG. 1) of the working cylinder 3 is attached to the tailgate 2. In the area 10 outside the trunk opening 6, but inside the wall 7 a drain channel for water can be arranged. Herein, this side of the wall 7 is called the drain channel side or working cylinder side of the wall 7. The wall 7 may form the drain channel.

FIG. 3 also shows a device 13 for reinforcement of the wall 7 where the working cylinder 3 of the power opening tailgate 2 of the vehicle 1 is attached. This device 13 will be further described with reference to FIGS. 4-7.

The description herein is made for the working cylinder on the left-hand side of the vehicle but does apply for a working cylinder on the right-hand side of the vehicle too, although the structure is mirror inverted.

Figure 4:
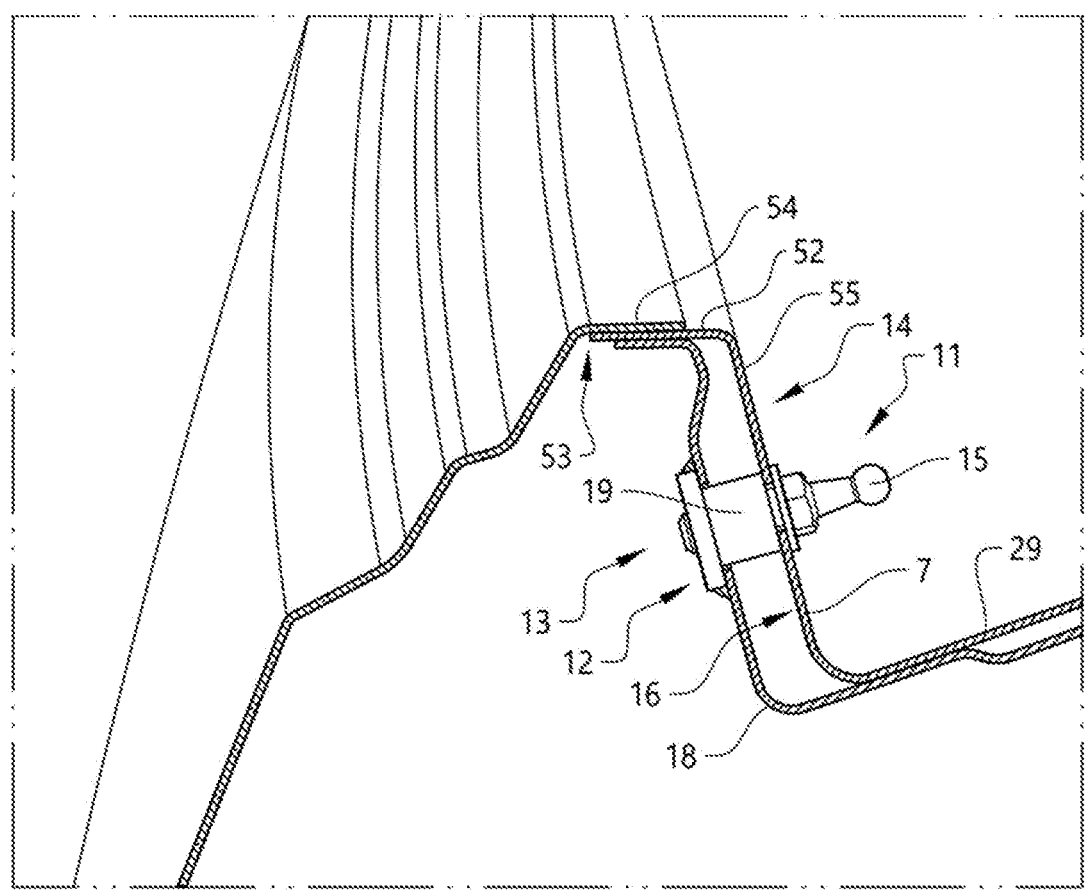
FIG. 4 is a cut view showing a device comprising an attachment means and a reinforcement component.

FIG. 4 shows in a cut view the device 13 for a power opening tailgate 2 of a vehicle 1. Further, the attachment position for the working cylinder 3 at the wall 7 is shown. Both the working cylinder 3 and the tailgate 2 are here omitted for illustration purposes only. The device 13 comprises an attachment means 11 mounted to a vehicle wall 7 at a first side 14 of the vehicle wall 7. The attachment means supports a working cylinder 3 arranged for opening the tailgate 2.

In the embodiment illustrated in FIG. 4, the vehicle wall 7 is the wall mentioned hereinabove which wall extends outside the trunk opening 6 and defines the outer boundary for the drain channel. Thus, the wall 7 forms the drain channel. The wall 7 has a portion that protrudes from the vehicle body structure part 29 arranged between the wall 7 and the trunk opening 6. The wall portion 7 and the vehicle body structure part 29 can be angled relative to each other by an angle of substantially 90°, for instance.

The wall portion 7 and the body structure part 29 can be made from one and the same plate 55. The plate can also form a second upper wall portion 52 angled relative to the wall portion 7 protruding from the body structure part 29. The second upper wall portion 52 can have an extension direction substantially in parallel with the extension direction of the body structure part 29. By the second upper wall portion 52 arranged between the wall portion 7 and the end 53 of the plate 55, access for welding the plate to another plate 54 and/or a bracket 18 of the device 13 (described hereinafter) will be facilitated.

The attachment means 11 suitably comprises a pivot member 15 allowing pivot motion of the working cylinder 3. The working cylinder 3 is arranged to pivot relative to the vehicle wall 7 during opening and closing of the tailgate 2. For example, such a pivot member can be a ball stud 15.

The device 13 further comprises a component 12 for reinforcement of the vehicle wall 7. The reinforcement component 12 is mounted to the vehicle wall 7 at a second side 16 of the vehicle wall 7, which second side 16 is opposite to the first side 14 of the vehicle wall 7. The attachment means 11 and the reinforcement component 12 are mechanically connectable to each other via a through hole 17 of the vehicle wall 7, which is further illustrated in FIG. 5.

Figure 5:
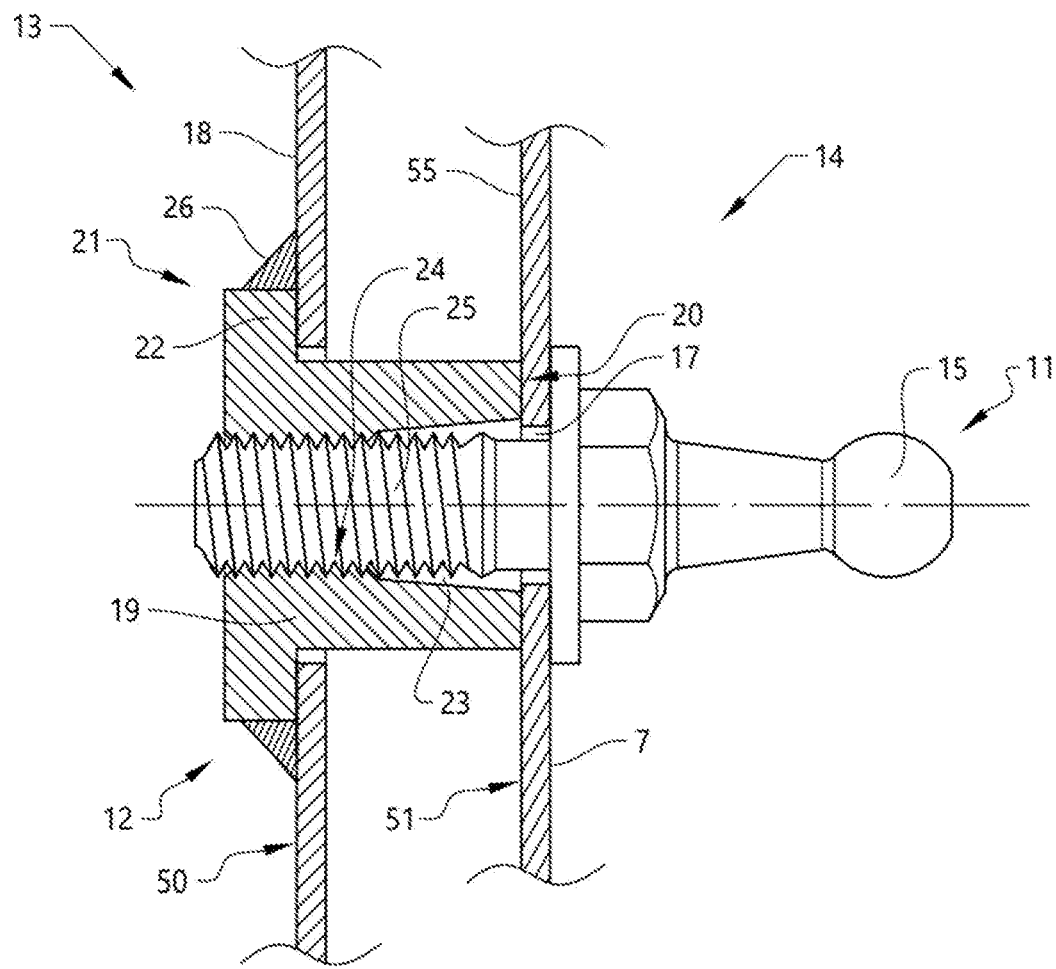
FIG. 5 is an enlarged view showing the connection between the attachment means and the reinforcement component.

FIG. 5 shows in a partly cut view the device 13, particularly the connection between the attachment means 11 and the reinforcement component 12. The reinforcement component 12 preferably comprises a bracket 18 and a spacer 19 for positioning the bracket 18 at a distance from the vehicle wall 7. The bracket 18 can be made from a thin metal plate or sheet by pressing. The spacer 19 has suitably a first end 20 for abutting the vehicle wall 7 and a second end 21 having a flange 22 for abutting the bracket 18.

In the example embodiment illustrated in FIG. 5, where the first end 20 of the spacer 19 abuts the wall 7, and the flange 22 at the second end 21 of the spacer 19 abuts the bracket 18, the flange 22 is arranged to abut the bracket 18 on a surface 50 of the bracket facing away from the wall 7. As further illustrated in FIG. 5, the first end 20 of the spacer 19 can be arranged to abut the wall 7 on a surface 51 of the wall facing away from the first side 14 of the wall.

The wall 7 can be made from one single metal plate 55 or sheet at a position where the attachment means 11 is arranged, for reducing the need of welding required and/or other assembling steps, for instance. The first end 20 of the spacer 19 is suitably arranged to abut said plate 55 as illustrated in FIG. 5.

The spacer 19 can be pipe-shaped with a hole 23 for alignment with the through hole 17 of the vehicle wall 7, and an inside surface 24 of the spacer 19 can be threaded for connection to the attachment means 11. The spacer can be made by machining. The hole 23 of the spacer 19 can be through hole for facilitating assembling.

The spacer 19 is preferably arranged for transferring load from the attachment means 11 to the bracket 18. The stress caused by the working cylinder 3 in the wall 7 at a position where the attachment means 11 is arranged can thereby be reduced.

A portion 25 of the attachment means 11 and the spacer 19 can be connectable to each other. Although in the example embodiment illustrated in FIG. 5, the attachment means portion 25 is designed to extend through the through hole 17 of the vehicle wall 7 for connection to the spacer 19, in another embodiment of the device, a portion of the spacer could extend through the through hole of the vehicle wall for connection to the attachment means. Here, the attachment means portion 25 is a threaded pin received by the threaded internal surface 24 of the spacer 19. Thus, the attachment means 11 and the reinforcement component 12 are suitably mechanically connectable to each other by means of a threaded joint.

Further, the bracket 18 and the spacer 19 are suitably attached to each other by a weld 26. By welding along the periphery of the flange 22 of the spacer 19, the load transferred from the working cylinder 3 can be distributed in the bracket 18 in a favorable way. The bracket 18 in turn can be attached to and supported by the vehicle body structure 4. For example, the bracket 18 can be supported by a portion of the vehicle wall 7 to which the working cylinder 3 is attached. The bracket 18 can be spot-welded to a wall portion where any impact on the appearance of the design is less critical or negligible.

The spacer 19 is preferably pre-assembled to the bracket 18 by welding, wherein the spacer 19 and the bracket 18 form one unit to be attached to the body structure 4.

Figure 6A:
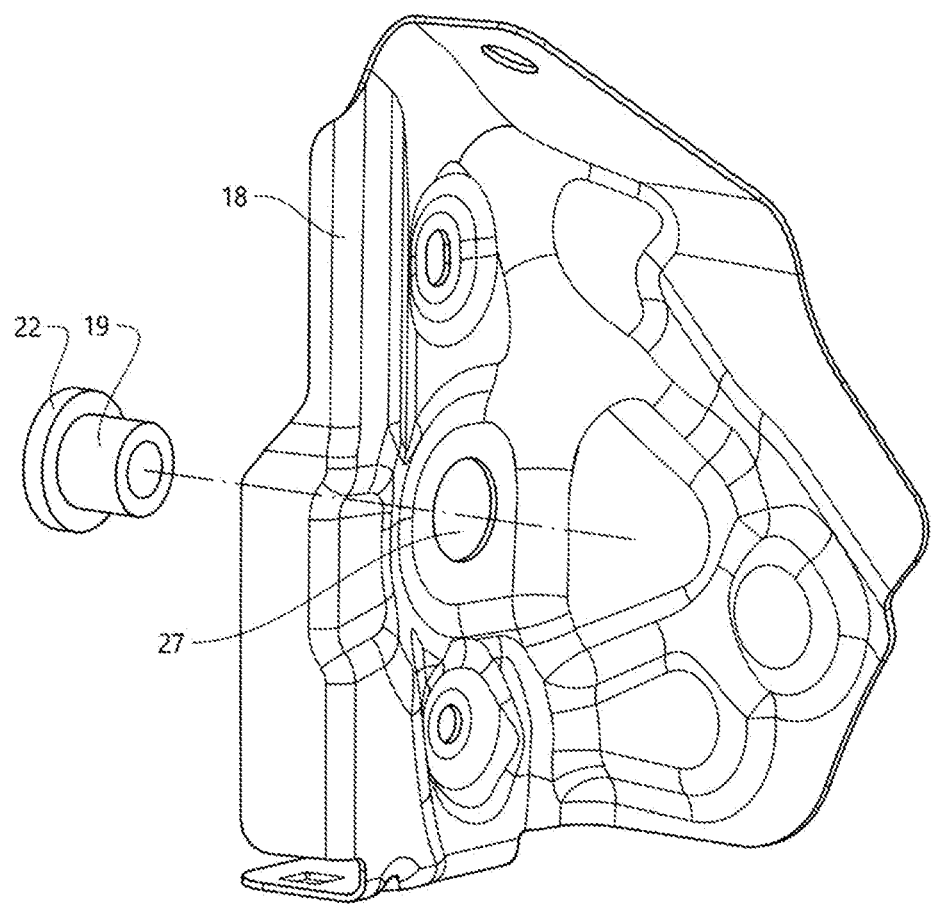
FIG. 6A is an exploded view showing a spacer and a bracket of the reinforcement component.
Figure 6B:
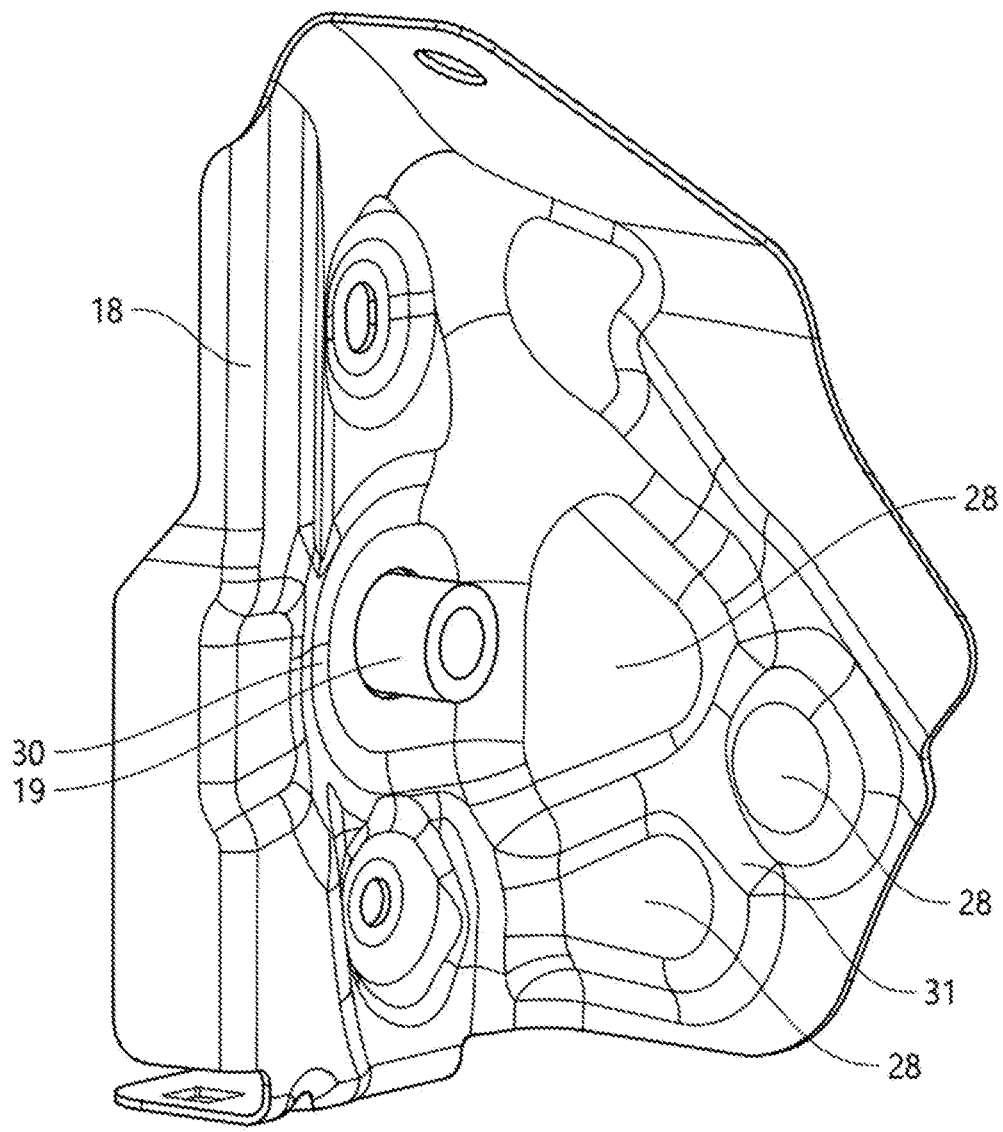
FIG. 6B shows the spacer and bracket of FIG. 6A when mounted to each other.

FIGS. 6A and 6B show the bracket 18 and the spacer 19 in an exploded view and when the spacer is mounted to the bracket, respectively. The spacer 19 is mounted to the bracket 18 by inserting the spacer into a hole 27 of the bracket 18 such that the flange 22 abuts against the bracket surface 50 (also illustrated in FIG. 5) and by welding as described hereinabove.

Further, the bracket 18 is provided with areas 28 for contacting the body structure 4 at positions where the bracket 18 can be spot-welded. In the illustrated example embodiment in FIGS. 6A, 6B and 7, the bracket 18 has a first portion 30 to be mounted to the vehicle wall 7 at the second side 16 of the vehicle wall 7, and a second portion 31 having the areas 28 for welding the bracket 18 to the body structure 4. The first bracket portion 30 and the second bracket portion 31 are angled relative to each other.

Figure 7:
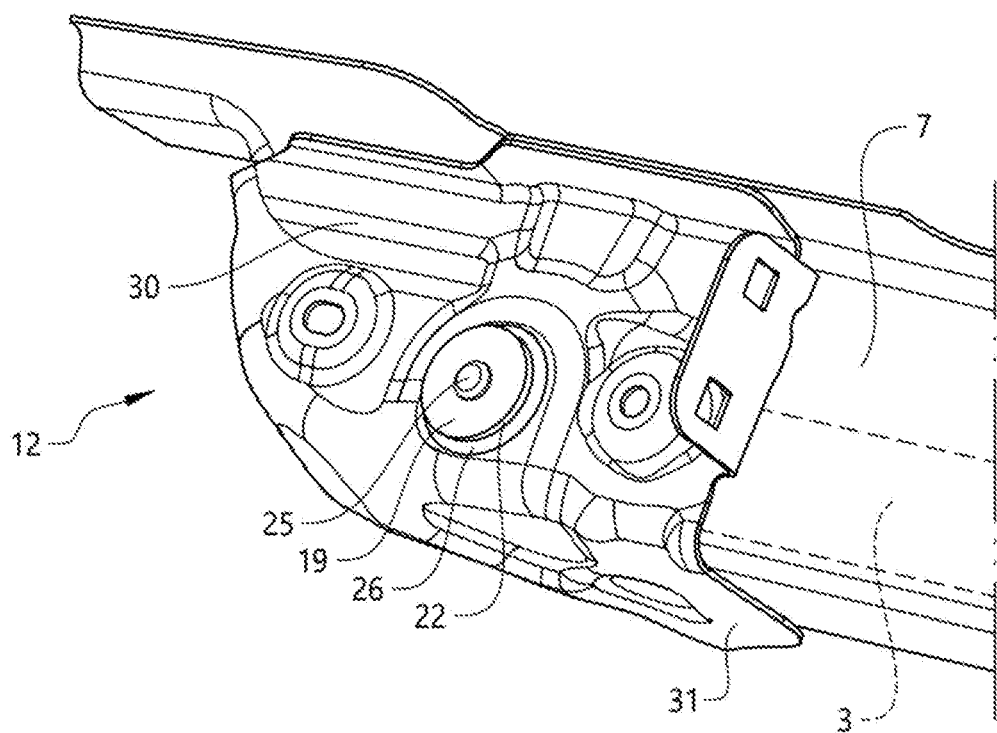
FIG. 7 shows the reinforcement component attached to a vehicle wall.

FIG. 7 shows the reinforcement component 12 attached to the vehicle wall 7 on the second side 16 of the vehicle wall 7. The first bracket portion 30 and the spacer 19 are joined by a weld 26 extending around the flange 22 of the spacer. See also FIG. 5 where the spacer 19 and the bracket 18 are attached to each other by the weld 26.

The spacer 19 is in turn mechanically connected to the threaded pin 25 of the attachment means 11 which pin extends through the through hole 17 of the vehicle wall 7. The second bracket portion 31 is spot-welded to the body structure 4. This means that when looking in a direction towards the working cylinder 3 as in FIG. 3, the welds connecting the bracket 18 and the body structure 4 are positioned behind the working cylinder 3. The bracket 18 comprising the first bracket portion 30 and the second bracket portion 31 is also illustrated in FIG. 3 by dashed lines indicating the same bracket position as in FIG. 7.

It is to be understood that the present invention is not limited to the embodiments described above and illustrated in the drawings; rather, the skilled person will recognize that many changes and modifications may be made within the scope of the appended claims.

What is claimed is:

1. A device for a power opening tailgate of a vehicle, the device comprising:
   an attachment means mountable to a vehicle wall at a first side of the vehicle wall for supporting a working cylinder for opening the tailgate; and
   a reinforcement component for reinforcement of the vehicle wall, the reinforcement component being mountable to a second side of the vehicle wall, the second side being opposite to the first side, the reinforcement component having a bracket and a spacer for positioning the bracket at a distance from the vehicle wall, the spacer having a first end for abutting a surface of the second side of the vehicle wall and a second end having a flange for abutting the bracket on a surface of the bracket facing away from the vehicle wall,
   wherein the attachment means and the reinforcement component are mechanically connectable to each other via a through hole of the vehicle wall at a position where the vehicle wall is made of a single plate and the first end of the spacer is arranged to abut the plate.

2. The device according to claim 1, wherein the spacer is pipe-shaped with a hole for alignment with the through hole of the vehicle wall.

3. The device according to claim 2, wherein an inside surface of the spacer is threaded.

4. The device according to claim 1, wherein the spacer is arranged for transferring load from the attachment means to the bracket.

5. The device according to claim 1, wherein a portion of the attachment means and the spacer are connectable to each other.

6. The device according to claim 5, wherein the attachment means portion is designed to extend through the through hole of the vehicle wall.

7. The device according to claim 1, wherein the bracket and the spacer are attached to each other by welding.

8. The device according to claim 1, wherein the attachment means and the reinforcement component are connectable to each other by means of a threaded joint.

9. The device according to claim 1, wherein the attachment means comprises a pivot member allowing pivot motion of the working cylinder relative to the vehicle wall.

10. A vehicle body structure comprising a device according to claim 1.

11. A vehicle comprising:
    a body structure defining a trunk and having a wall, an attachment means mounted to the wall at a first side of the wall and a reinforcement component for reinforcement of the wall, the reinforcement component having a bracket and a spacer for positioning the bracket at a distance from the wall, the spacer having a first end arranged to abut the wall on a surface of the wall facing away from the first side of the wall and a second end having a flange arranged to abut the bracket on a surface of the bracket facing away from the wall;
    a tailgate constituting a delimiting surface for the trunk in a closed position; and
    a working cylinder for moving the tailgate relative to the body structure to an opened position for enabling access to the trunk, the working cylinder being arranged on the first side of the wall and a first end of the working cylinder being connected to the attachment means and a second end of the working cylinder being connected to the tailgate,
    wherein the reinforcement component is mounted to the wall at a second side of the wall, which second side is opposite to the first side of the vehicle wall, and the attachment means and the reinforcement component are mechanically connected to each other via a through hole of the wall, and
    wherein at a position where the attachment means is arranged, the wall is made of a single plate and the first end of the spacer is arranged to abut the plate.

12. The vehicle according to claim 11, wherein the spacer is arranged for transferring load from the attachment means to the bracket, thereby reducing the stress caused by the working cylinder in the wall at a position where the attachment means is arranged.

13. The vehicle according to claim 11, wherein the spacer is pre-assembled to the bracket by welding, the spacer and the bracket forming one unit to be attached to the body structure.

14. The vehicle according to claim 11, wherein the bracket is spot-welded to the body structure.

15. The vehicle according to claim 11, wherein a drain channel is arranged at the first side of the wall.

16. The vehicle according to claim 14, wherein the wall forms the drain channel.

17. The vehicle according to claim 11, wherein the tailgate is a power opening tailgate that is openable by means of the working cylinder.

18. The vehicle according to claim 11, wherein the opening of the tailgate is remotely-controlled.

* * * * *